United States Patent
van den Bergh et al.

(10) Patent No.: US 6,827,022 B2
(45) Date of Patent: Dec. 7, 2004

(54) MAGNETIC LEVITATION AND PROPULSION SYSTEM

(75) Inventors: Hugo H. van den Bergh, San Diego, CA (US); Robert Kratz, San Diego, CA (US); Philip L. Jeter, San Diego, CA (US)

(73) Assignee: General Atomics, San Diego, CA (US)

(*) Notice: Subject to any disclaimer, the term of this patent is extended or adjusted under 35 U.S.C. 154(b) by 0 days.

(21) Appl. No.: 10/330,733

(22) Filed: Dec. 27, 2002

(65) Prior Publication Data

US 2004/0123766 A1 Jul. 1, 2004

(51) Int. Cl.[7] ............................................. B60L 13/06
(52) U.S. Cl. ........................................................ 104/284
(58) Field of Search ................................. 104/281, 282, 104/283, 284, 287, 288, 292, 293

(56) References Cited

U.S. PATENT DOCUMENTS

| | | | |
|---|---|---|---|
| 5,253,592 A | * 10/1993 | Coffey | 104/281 |
| 5,649,489 A | 7/1997 | Powell | |
| 5,722,326 A | * 3/1998 | Post | 104/281 |
| 5,809,897 A | 9/1998 | Powell | |
| 6,044,770 A | 4/2000 | Davey | |
| 6,085,663 A | 7/2000 | Powell | |
| 6,118,193 A | 9/2000 | Morris | |
| 6,152,045 A | 11/2000 | Powell et al. | |
| 6,510,799 B2 | * 1/2003 | Lamb et al. | 104/281 |

* cited by examiner

Primary Examiner—S. Joseph Morano
Assistant Examiner—Robert J. McCarry, Jr.
(74) Attorney, Agent, or Firm—Nydegger & Associates

(57) ABSTRACT

A system for levitating and propelling a vehicle along a stationary guideway includes a linear synchronous motor (LSM) having a component mounted on the vehicle and a component mounted on the guideway. The LSM components interact to generate electromagnetic forces that act to levitate the vehicle and electromagnetic forces that act to propel the vehicle along the guideway. The gap between LSM components is maintained by an electrodynamic system (EDS) having a component mounted on the vehicle and a component mounted on the guideway. The EDS components cooperate to create an electromagnetic force that acts with the levitation forces created by the LSM to maintain the LSM gap within a predetermined range. Maintenance of the LSM gap stabilizes the LSM and allows the LSM to operate efficiently within a pre-selected range of vehicle speeds.

24 Claims, 5 Drawing Sheets

MAGNETIC LEVITATION AND PROPULSION SYSTEM

"This invention was made with Government support under Agreement No. CA-26-7025 awarded by the Federal Transit Administration. The Government has certain rights in the invention."

FIELD OF THE INVENTION

The present invention pertains generally to systems for levitating and propelling a magnetically levitated (MAGLEV) vehicle. More particularly, the present invention pertains to levitation and propulsion systems that are energy efficient over a pre-selected range of vehicle speeds. The present invention is particularly, but not exclusively, useful as an efficient levitation and propulsion system consisting of a linear synchronous motor (LSM) and an Electro-Dynamic (levitation) System (EDS) arranged uniquely into an inherently stable system.

BACKGROUND OF THE INVENTION

Magnetic levitation systems, often called MAGLEV systems, use magnetic fields to levitate a vehicle over a stationary guideway. Because the vehicle does not physically contact the guideway during acceleration and normal high-speed operation, energy losses associated with contact friction are greatly reduced. Still, magnetic drag forces, if not taken into consideration, can offset the benefits of reduced contact friction resulting in an inefficient transportation system.

Heretofore, electromagnetic systems (EMS) and Electro-Dynamic Systems (EDS) have been used to levitate vehicles. The EMS systems use the attraction between electromagnets attached to the vehicle and iron rails on the guideway to produce the required levitation force. Such a system is inherently unstable and active control of the electromagnets is required to maintain the gap between the iron rails and the electromagnets. Specifically, any fluctuation in the gap from irregularities in the track or external forces on the vehicle/guideway must be immediately countered. As one might expect, the required active control system is complicated, expensive and unreliable. With the Electro-Dynamic System (EDS), eddy currents induced in electrically conductive material on the track by a traveling magnetic field from magnets on the vehicle, produce a levitation force by their interaction with the array of magnets in the vehicle. This interaction produces drag forces that must be overcome by the propulsion system.

A linear synchronous motors (LSM), generates forces that can be used to propel a vehicle and additionally, forces that act in a direction orthogonal to the direction of propulsion. One example of a linear synchronous motor includes an armature having an a.c. poly-phase winding on an armature. This armature can be mounted on the stationary guideway for interaction with permanent magnets mounted on the vehicle. By embedding the armature winding in ferromagnetic material, attractive forces generated between the armature and the magnets can be used to levitate the vehicle. These attractive forces are generated without also generating drag forces.

Alone, the LSM is unstable and the LSM gap between the armature and magnets cannot be maintained. Specifically, even slight decreases in the LSM gap cause the attractive force between the armature and magnets to increase, and the increased force acts to further close the LSM gap. In addition to stability considerations, the efficiency of the linear synchronous motor must be considered. In this regard, the efficiency of the LSM is highly dependant on the width of the LSM gap. Specifically, the LSM is most efficient when the LSM gap is maintained relatively small.

In light of the above, it is an object of the present invention to provide systems suitable for the purposes of levitating and propelling a vehicle over a guideway that are stable and energy efficient. It is another object of the present invention to provide MAGLEV levitation and propulsion systems that provide passive levitation control with reduced peak and average magnetic drag forces. It is yet another object of the present invention to provide MAGLEV levitation and propulsion systems that remain stable in spite of unwanted fluctuations in propulsion system currents and/or external forces acting on the vehicle. Still another object of the present invention is to provide MAGLEV levitation and propulsion systems that can be used to provide lateral stability to the MAGLEV vehicle. It is still another object of the present invention to provide MAGLEV levitation and propulsion systems that are efficient during acceleration from low vehicle speeds (i.e. at peak power). It is another object of the present invention to provide MAGLEV levitation and propulsion systems that are efficient at high vehicle speeds (i.e. operating speeds). Yet another object of the present invention is to provide MAGLEV levitation and propulsion systems which are easy to use, relatively simple to implement, and comparatively cost effective.

SUMMARY OF THE INVENTION

The present invention is directed to a system for levitating and propelling a vehicle along a stationary guideway. In functional overview, the system is designed for energy efficiency over a predetermined vehicle speed range. In one embodiment, the system is designed for maximum power and efficiency during vehicle acceleration from zero speed. In another embodiment of the present invention, the system is designed for maximum efficiency at operational speeds. In addition to efficiency considerations, the system is designed to be inherently stable (unlike an EMS system or LSM system acting alone) in spite of increases in LSM armature winding current or external forces acting on the vehicle. This inherent stability of the system also allows the system to be used to provide lateral stability to the vehicle.

In accordance with the present invention, the levitation and propulsion system includes a linear synchronous motor (LSM) having two LSM components. One LSM component is mounted on the vehicle and the other LSM component is mounted on the guideway. When the vehicle is positioned on the guideway, the LSM components of the linear synchronous motor are juxtaposed and define an LSM gap between the LSM components.

For the present invention, one of the LSM components includes either a switched direct-current winding or a poly-phase winding on an iron core, and the other LSM component includes a plurality of magnetic poles mounted on a rail. Functionally, the linear synchronous motor is provided to produce a first electromagnetic force between the LSM components that acts to levitate the vehicle and a second electromagnetic force between the LSM components that acts to propel the vehicle along the guideway. Importantly, the magnitudes of these electromagnetic forces are dependent on the width of the LSM gap, the LSM armature winding current, the size of the iron core and the total vehicle load. As indicated above, a linear synchronous motor, by itself, is unstable and this instability closes the LSM gap prohibiting movement of the vehicle.

For the present invention, the levitation and propulsion system includes an electrodynamic system (EDS) to maintain the LSM gap within a desired width range. More specifically, a small LSM gap is maintained by the EDS over a predetermined range of vehicle speeds because the linear synchronous motor is most efficient when the LSM gap is small. Also, by maintaining the LSM gap within a desired width range, the LSM instabilities described above are eliminated.

Structurally, the electrodynamic system has an EDS component mounted on the vehicle and another EDS component mounted on the stationary guideway. During vehicle movement along the guideway, the EDS components cooperate to create an electromagnetic force that reacts with the levitation forces created by the LSM. Like the LSM, when the vehicle is positioned on the guideway, the EDS components are juxtaposed and define an EDS gap between the EDS components. In the preferred embodiment of the present invention, one of the EDS components is a magnet array and the other EDS component is a plurality of conductive cables, with each cable extending in a direction orthogonal to the direction of vehicle travel and short-circuited at both ends. Importantly, the magnitude of the electromagnetic force generated by the EDS is dependent on the width of the EDS gap and the speed of the vehicle relative to the stationary guideway.

As indicated above, the linear synchronous motor defines an LSM gap and the electrodynamic system defines an EDS gap. For the present invention, the vehicle is configured relative to the guideway to cause the width of these gaps to vary equally as the amount of vehicle levitation varies. In a first embodiment of the present invention, the widths of both the LSM and EDS gaps decrease with increasing vehicle levitation over the guideway.

In this embodiment, the LSM establishes an electromagnetic force that tends to levitate the vehicle while the EDS establishes an electromagnetic force that opposes levitation of the vehicle. For a vehicle at constant speed any change in levitation will change both the LSM and EDS gaps equally. Thus any change in levitation force generated by the LSM will be counteracted by a change in the EDS-generated force opposing levitation. By properly sizing the EDS and LSM systems, a substantially constant levitating force at constant speed can be obtained that results in stable vehicle travel.

For this embodiment, the opposing force generated by the EDS is small at low vehicle speeds. Since the opposing force is small, vehicle levitation is large and the LSM gap is small (See above). During acceleration, which is generally required when the vehicle is at low speeds, the LSM is most efficient with a small gap width. Thus, this embodiment of the present invention which maintains a small LSM gap width at low vehicle speeds, establishes an efficient levitation and propulsion system.

In an alternate embodiment of the present invention, the vehicle is configured wherein the width of the LSM gap decreases with increasing vehicle levitation over the guideway, while the width of the EDS gap increases with increasing vehicle levitation over the guideway. For this embodiment, both the LSM and the EDS establish electromagnetic forces that act to levitate the vehicle (i.e. no opposing force is created). For a vehicle at low speed and low vehicle levitation, the LSM gap is relatively large and the EDS gap is relatively small. Accordingly, both the LSM and EDS levitating forces are relatively weak. On the other hand, at higher vehicle speeds and levitations, the LSM gap is relatively small and the EDS gap is relatively large. Accordingly, at higher vehicle levitations the LSM levitating force is relatively strong and the EDS levitating force is relatively weak.

Like the first embodiment described above, in this embodiment, the EDS force acts with the LSM force to establish a substantially constant force over a range of LSM gap widths. This embodiment differs from the above described embodiment, however, because in this embodiment, maximum LSM efficiency is obtained at high vehicle speeds (i.e. operating speed) rather than during acceleration from low speed. In greater detail, at operating speed, the EDS force is relatively strong, the LSM levitating force is relatively weak, and the LSM gap is small. Thus, since the LSM is efficient at small LSM gap widths, in this embodiment, the system is efficient at operating speed.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
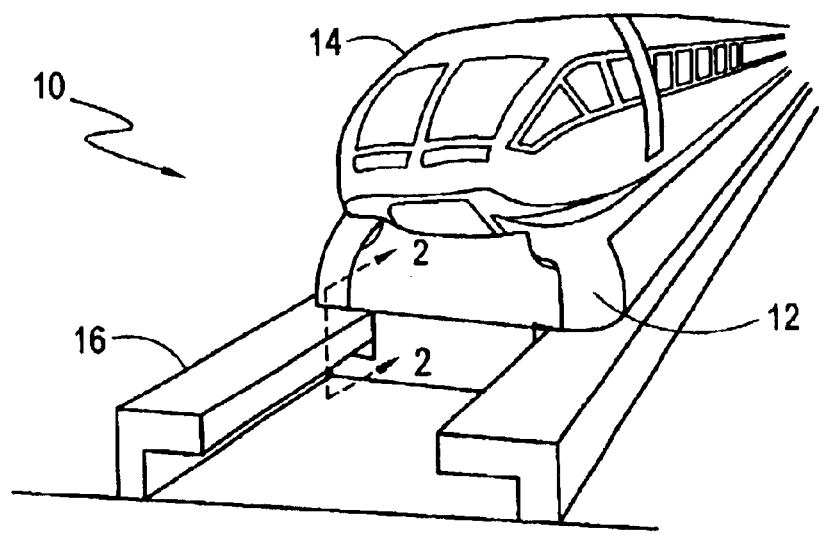
FIG. 1 is a perspective view of a MAGLEV vehicle traveling along a guideway.
Figure 2:
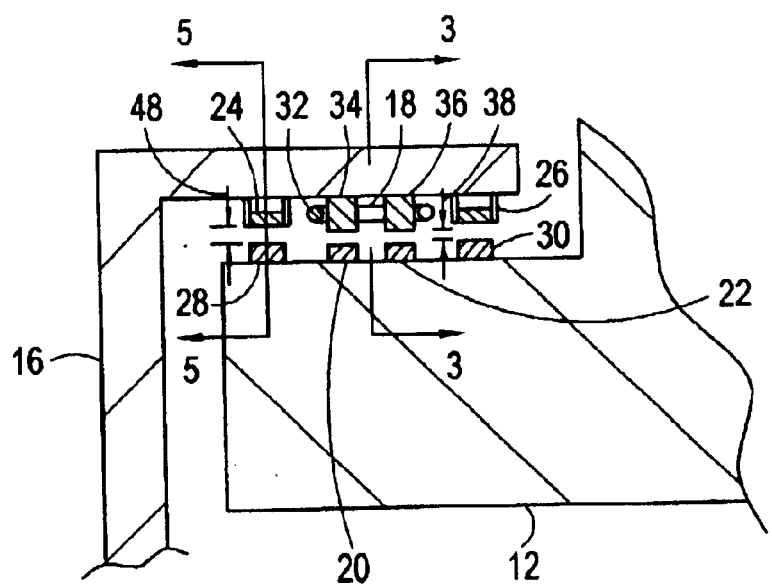
FIG. 2 is a sectional view as seen along line 2—2 in FIG. 1 showing a levitation and propulsion system in accordance with the present invention.

Referring to FIG. 1, a MAGLEV system in accordance with the present invention is shown and generally designated 10. As shown in FIG. 1, the system 10 includes a vehicle 12 having an optional passenger compartment 14. It is to be appreciated that the vehicle 12 is provided for levitation over and travel along a guideway 16. Although a vehicle 12 is shown for the system 10, it is to be appreciated that the system 10 can levitate and propel other objects and is not limited to the levitation and propulsion of manned vehicles. Referring now to FIG. 2, it can be seen that a levitation and propulsion system is provided having a linear synchronous motor (LSM) and an electrodynamic system (EDS). More specifically, the LSM includes a plurality of LSM armatures 18 and corresponding LSM magnet arrays 20, 22. As further shown, the electrodynamic system includes EDS conductive tracks 24, 26 and corresponding EDS magnet arrays 28, 30.

Figure 3:
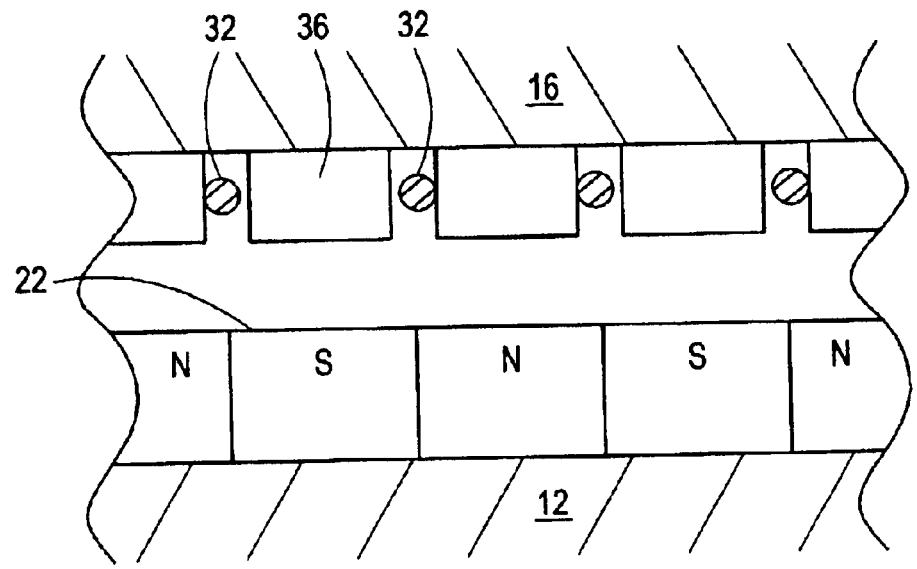
FIG. 3 is a sectional view as seen along line 3—3 in FIG. 2 showing a portion of an LSM armature and corresponding LSM magnet array.

With cross reference now to FIGS. 2 and 3, it can be seen that each LSM armature 18 is mounted on the guideway 16 and includes a winding 32. For the present invention, the winding 32 is connected to an electrical power source (not shown) and can be a switched direct-current winding or a set of a.c. poly-phase distributed windings. Also shown, each LSM armature 18 further includes an armature core that preferably includes a pair of ferromagnetic bars 34, 36 that are separated from each other by an air gap. The winding 32 is placed into grooves in the ferromagnetic bars 34, 36 to establish the LSM armature 18.

With continued cross reference to FIGS. 2 and 3, it can be seen that each LSM magnet array 20, 22 is mounted on the vehicle 12 and substantially centered opposite a corresponding ferromagnetic bar 34, 36 of the LSM armature 18. Although the LSM magnet arrays 20, 22 are shown mounted on a shelf of the vehicle 12, it is to be appreciated that the LSM magnet arrays could also be mounted on the top of the vehicle 12 for interaction with a guideway 16 that extends above the vehicle 12. Further, the LSM magnet arrays 20, 22 are spaced from the corresponding ferromagnetic bar 34, 36 by an LSM gap having an LSM gap width 38. It is to be appreciated from cross referencing FIGS. 1 and 2 that the LSM gap width 38 varies with the variation in levitation of the vehicle 12 over the guideway 16.

Figure 4:
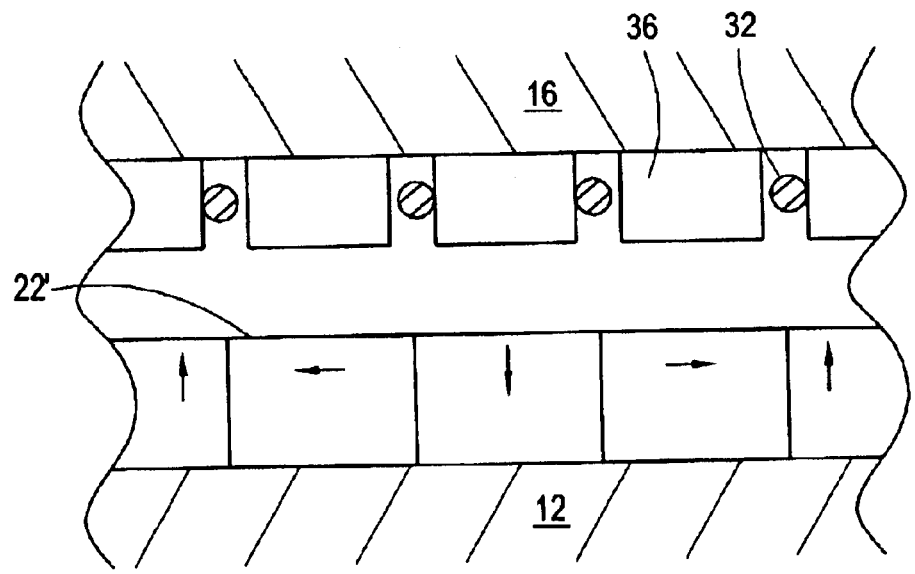
FIG. 4 is a sectional view as in FIG. 3 showing an alternate embodiment of an LSM magnet array and corresponding portion of an LSM armature.

With cross reference to FIGS. 2 and 3, it can be seen that each LSM magnet array 20, 22 includes a plurality of magnet poles that alternate in polarity (i.e. N, S, N, S . . . ) along the magnet array 20, 22. In an alternate embodiment as shown in FIG. 4, each LSM magnet array such as LSM magnet array 22' is configured as a Halbach array, with each magnet being polarized in the direction as indicated by the corresponding arrow. Although the LSM armature 18 is shown mounted on the guideway 16 and the corresponding LSM magnet arrays 20, 22 are shown mounted on the vehicle 12 in FIG. 2, it is to be appreciated by those skilled in the pertinent art that the same effect could be achieved by mounting the LSM armature 18 on the vehicle 12 and mounting the corresponding LSM magnet arrays 20, 22 on the guideway 16.

Functionally, the linear synchronous motor is provided to produce an attractive electromagnetic force between the LSM armature 18 and LSM magnet arrays 20, 22 that acts to levitate the vehicle 12 and an electromagnetic force between the LSM armature 18 and LSM magnet arrays 20, 22 that acts to propel the vehicle 12 along the guideway 16. Importantly, the magnitudes of these electromagnetic forces are dependent on the LSM gap width 38, the magnitude of the current in the winding 32 of the LSM armature 18 and the size of the ferromagnetic bars 34, 36. As indicated above, a linear synchronous motor, by itself, is unstable and these instabilities close the LSM gap prohibiting the movement of the vehicle.

Figure 5:
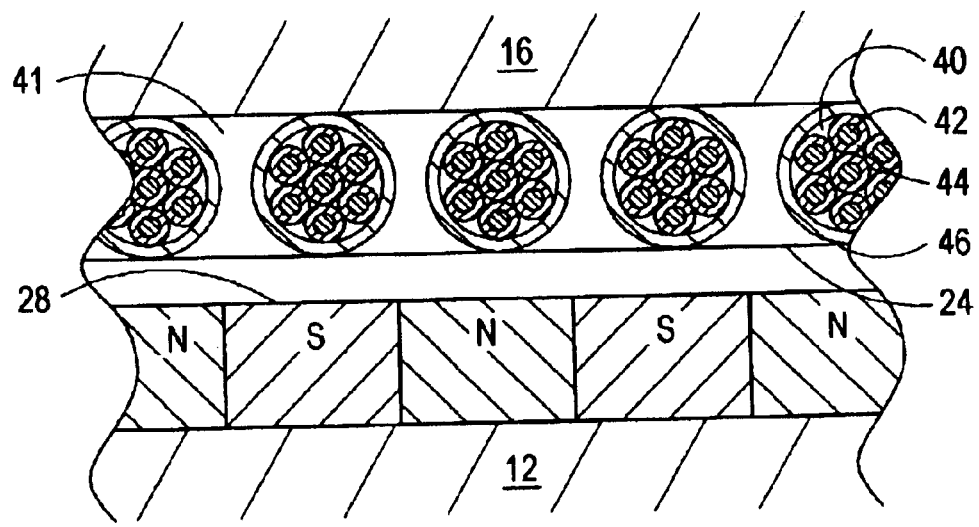
FIG. 5 is a sectional view as seen along line 5—5 in FIG. 2 showing a portion of an EDS having a conductive track and a magnet array.

Referring now with cross reference to FIGS. 2 and 5, it can be seen that the electrodynamic system includes EDS conductive tracks 24, 26 that are mounted on the guideway 16 and EDS magnet arrays 28, 30 that are mounted on the vehicle 12. As further shown, each conductive track 24, 26 preferably includes a plurality of parallel, conductive cables 40 that run orthogonal to the direction in which the corresponding EDS magnet array 28, 30 moves during travel of the vehicle 12. Each conductive cable 40 is short circuited between a pair of conductive bus bars 41 to allow induced currents to be formed in each conductive cable 40 as the corresponding magnet array 28, 30 moves relative to the conductive track 24, 26. Although the conductive tracks 24, 26 are shown having conductive cables 40, it is to be appreciated by those skilled in the pertinent art that other types of conductive tracks can be used in the electrodynamic system of the present invention. Examples of conductive tracks 24, 26 that can be used in the present invention include laminated sheets of conductive material (not shown).

Preferably, as shown, each cable 40 includes a plurality of conductive strands 42 that are individually insulated in an insulation jacket 44, as shown in FIG. 5. Although seven strands 42 have been shown for each cable 40, it is to be appreciated that seven strands 42 is merely exemplary and that any number of strands 42, such as several dozen, may be used in each cable 40. Further, in the preferred embodiment of the present invention, each conductive strand 42 is twisted around the other conductive strands 42 in the cable 40 to fully transpose each conductive strand 42 and thereby allow at least a portion of each strand 42 to reside near the surface of the cable 40. This cooperation of structure reduces the skin effect that would otherwise limit the formation of current in conductive cables 40 to a small cross-sectional area. Each cable 40 further includes a casing 46 made of a low magnetic permeability material.

With continued cross-reference to FIGS. 2 and 5, it can be seen that each EDS magnet array 28, 30 is mounted on the vehicle 12 and substantially centered opposite a corresponding EDS conductive track 24, 26. Further, the EDS magnet arrays 28, 30 are spaced from the corresponding EDS conductive tracks 24, 26 by an EDS gap having an EDS gap width 48. It is to be appreciated from cross referencing FIGS. 1 and 2 that the EDS gap width 48 varies with the variation in levitation of the vehicle 12 over the guideway 16.

Figure 6:
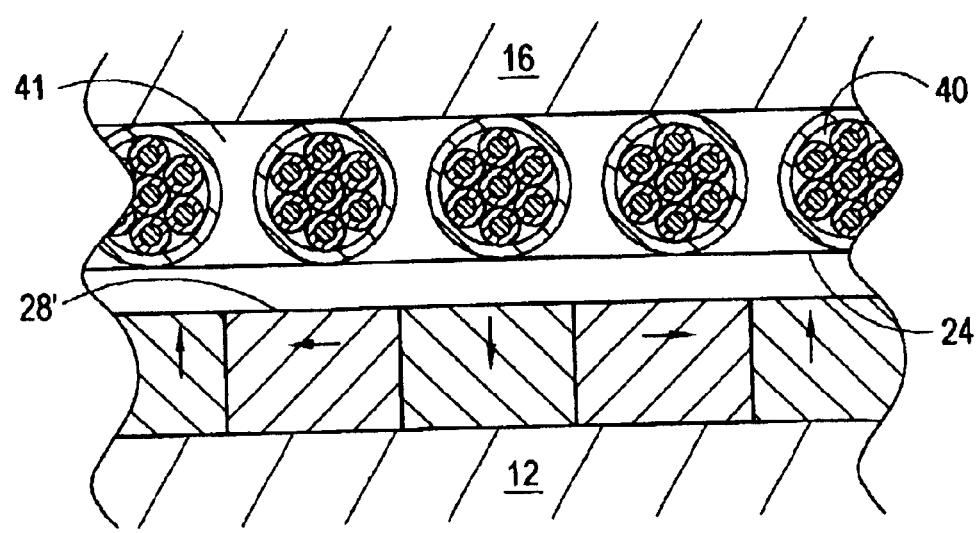
FIG. 6 is a sectional view as in FIG. 5 showing an alternate embodiment of an EDS magnet array and the corresponding EDS conductive track.

It can be further seen by cross referencing FIGS. 2 and 5 that each EDS magnet array 28, 30 includes a plurality of magnet poles that alternate in polarity (i.e. N, S, N, S . . . ) along the EDS magnet array 28, 30. In an alternate embodiment as shown in FIG. 6, each EDS magnet array 28, 30 such as EDS magnet array 28' is configured as a Halbach array, with each magnet being polarized in the direction as indicated by the corresponding arrow. Although the EDS conductive tracks 24, 26 are shown mounted on the guideway 16 and the corresponding EDS magnet arrays 28, 30 are shown mounted on the vehicle 12 in FIG. 2, it is to be appreciated by those skilled in the pertinent art that the same effect could be achieved by mounting the EDS conductive tracks 24, 26 on the vehicle 12 and mounting the corresponding EDS magnet array 28, 30 on the guideway 16.

It is to be further appreciated by those skilled in the pertinent art that during movement of the vehicle 12 along the guideway 16, a repulsive electromagnetic force between the EDS conductive tracks 24, 26 and the EDS magnet arrays 28, 30 is created. This repulsive electromagnetic force created by the EDS reacts with the levitation forces created by the LSM. Importantly, the magnitude of the electromagnetic force generated by the EDS is dependent on the EDS gap width 48 and the speed of the vehicle 12 relative to the stationary guideway 16.

Figure 7:
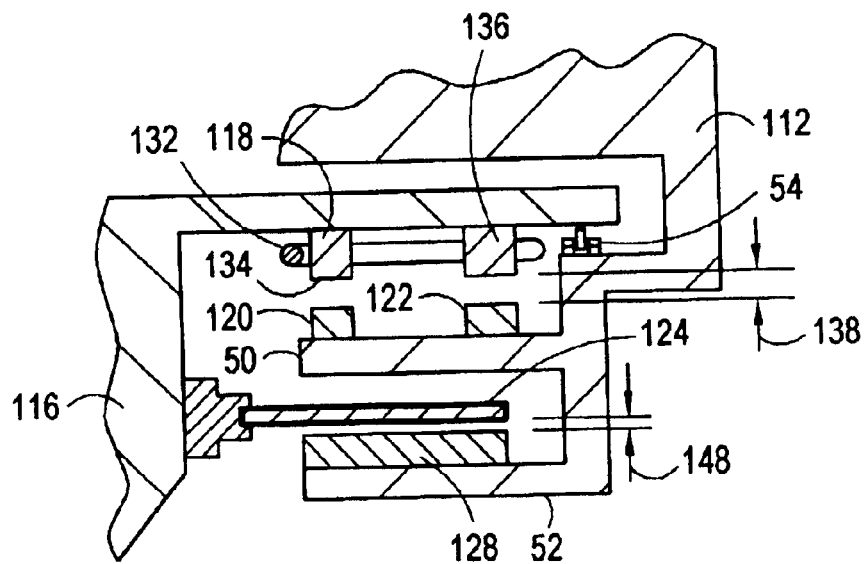
FIG. 7 is a sectional view as in FIG. 2 showing an alternate embodiment of a levitation and propulsion system in accordance with the present invention.

From FIG. 2 it is to be appreciated that the linear synchronous motor produces an upward directed force that acts to levitate the vehicle 12 while the EDS produces a downward directed force that opposes levitation of the vehicle 12. An alternate embodiment of the present invention is shown in FIG. 7 which operates in a similar manner as the embodiment shown in FIG. 2. Specifically, in both embodiments (i.e. the embodiments shown in FIG. 2 and FIG. 7), the LSM acts to levitate the vehicle 12 while the EDS opposes levitation of the vehicle 12. In the embodiment shown in FIG. 7, the vehicle 112 is formed with two shelves 50, 52. As further shown in FIG. 7, a single EDS magnet array 128 is mounted on shelf 52 for interaction with EDS conductive track 124 that extends horizontally from guideway 116. Thus, an EDS gap width 148 is established between the EDS magnet array 128 and the EDS conductive track 124. Additionally, as shown, LSM magnet arrays 120, 122 are mounted on shelf 50 for interaction with a plurality of LSM armatures 118 that are mounted on guideway 116, establishing LSM gap width 138.

With reference now to FIG. 7, the operation of the FIG. 7 embodiment will now be described. It is to be appreciated that this description of operation is equally applicable to the embodiment shown in FIG. 2, unless otherwise indicated herein. For the present invention, the electrodynamic system is provided to maintain the LSM gap width 138 within a desired width range. More specifically, a small LSM gap width 138 is maintained by the EDS while the vehicle 112 is at low speeds. At these low speeds where acceleration is required, the linear synchronous motor is most efficient when the LSM gap width 138 is small. Also, by maintaining the LSM gap width 138 within a desired width range at all vehicle 112 speeds, the LSM instabilities described above are eliminated.

With the vehicle 112 configured relative to the guideway 116 as shown in FIG. 7, both the LSM gap width 138 and the EDS gap width 148 decrease with increasing levitation of the vehicle 112 over the guideway 116. Further, the LSM establishes an electromagnetic force that tends to levitate the vehicle 112 while the EDS establishes an electromagnetic force that opposes levitation of the vehicle 112.

With the vehicle 112 stationary and no current flowing through the LSM armature 118, a levitating force is provided by the attraction between the LSM magnet arrays 120, 122 and the ferromagnetic bars 134, 136 of the LSM armature 118. Preferably, the ferromagnetic bars 134, 136 and LSM magnet arrays 120, 122 are sized large enough to levitate the vehicle 112 while the vehicle 112 is stationary and no current is flowing through the LSM armature 118. Levitation stops 54 are provided to limit the amount of levitation while the vehicle 112 is stationary and thereby establish a minimum LSM gap width 138 and EDS gap width 148. For the present invention, these stops 54 may consist of rollers, wheels or a low friction sliding surface (not shown).

When current is passed through the windings 132 of the LSM armature 118, the vehicle 112 accelerates from a stationary position, and the LSM levitation force increases due to the current in the winding 132. At the same time, movement of the vehicle 112 causes the EDS magnet array 128 to move relative to the EDS conductive track 124 and this movement creates a force that opposes levitation of the vehicle 112. Preferably, the EDS and LSM are sized so that the opposing force created by the EDS at a predetermined vehicle speed is slightly stronger than the levitating force created by the LSM. Accordingly, as the vehicle 112 accelerates from a stationary position, the EDS force pushes the vehicle 112 down and disengages the levitation stops 54 until an equilibrium between the LSM levitating force and the EDS opposing force is established. More specifically, the LSM and EDS are configured to maintain a minimum LSM gap width 138 above the predetermined vehicle 112 speed.

During constant vehicle 112 speed and low vehicle 112 levitation, both the LSM levitating force and the EDS opposing force are weak since both the LSM gap width 138 and EDS gap width 148 are large. On the other hand, at higher vehicle levitation, when both the LSM gap width 138 and EDS gap width 148 are small, both the LSM levitating force and the EDS opposing force are strong. Thus, the levitating and opposing forces combine to establish a fairly constant force over a range of LSM gap widths 138. By properly sizing the EDS and LSM systems, a substantially constant levitating force can be obtained that results in a stable travel for the vehicle 112. More specifically, external forces acting on the vehicle 112 from wind, aerodynamic drag, etc. that tend to reduce or increase the LSM gap width 138 will not significantly alter the levitating force, and thus, these external forces will not result in the closure of the LSM gap. It is to be appreciated from FIG. 1 that a levitation and propulsion system having an EDS and LSM can be provided on both sides of the vehicle 112 to provide lateral stability to the vehicle 112 (in addition to providing propulsion and levitation). In addition, lateral stability is provided due to the attraction between ferromagnetic bar 34 and LSM magnet array 20 and ferromagnetic bar 36 and LSM magnet array 22.

For these embodiments (i.e. FIG. 2 and FIG. 7), the opposing force generated by the EDS is weakest at low vehicle 112 speeds. Since the opposing force is weak, vehicle levitation is large and the LSM gap width 138 is small. During acceleration at low speeds, the LSM is most efficient with a small LSM gap width 138. Thus, the embodiments of the present invention shown in FIGS. 2 and 7 maintain a small LSM gap width 138 at low vehicle 112 speeds and thus provide a levitation and propulsion system that is efficient during acceleration from low vehicle 112 speeds.

Figure 8:
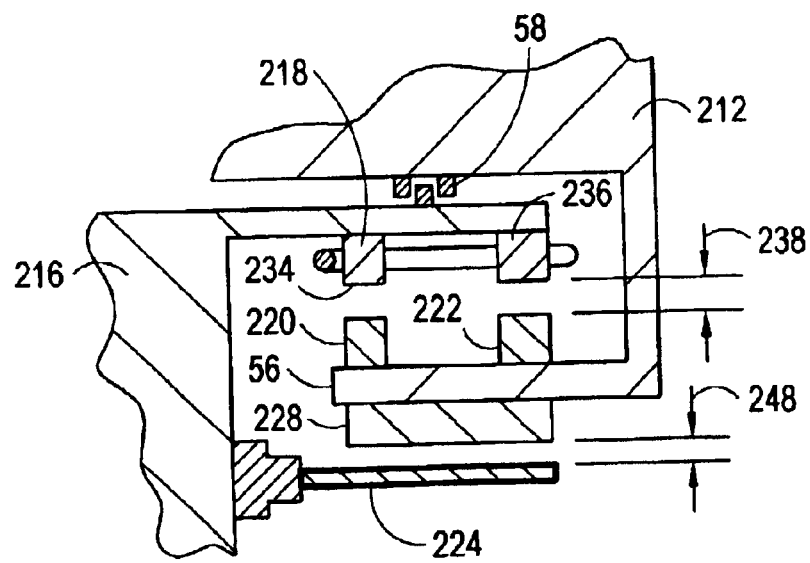
FIG. 8 is a sectional view as in FIG. 2 showing another alternate embodiment of a levitation and propulsion system in accordance with the present invention.

FIG. 8 shows another embodiment of a levitation and propulsion system in accordance with the present invention. Unlike the embodiments described above (i.e. FIGS. 2 and 7), in this embodiment the force generated by the EDS acts to levitate the vehicle 212. In the embodiment shown in FIG. 8 the vehicle 212 is formed with shelf 56. As further shown in FIG. 8, a single EDS magnet array 228 is mounted on a first side of shelf 56 for interaction with EDS conductive track 224 that extends horizontally from guideway 216. Thus, an EDS gap width 248 is established between the EDS magnet array 228 and the EDS conductive track 224. Additionally, as shown, LSM magnet arrays 220, 222 are mounted on a second side of shelf 56 for interaction with a plurality of LSM armatures 218 that are mounted on guideway 216, establishing LSM gap width 238.

With this cooperation of structure, LSM gap width 238 decreases with increasing vehicle 212 levitation over the guideway 216, while the EDS gap width 248 increases with increasing vehicle 212 levitation over the guideway 216. For the FIG. 8 embodiment, both the LSM and the EDS establish electromagnetic forces that act to levitate the vehicle 212 (i.e. no opposing force is created). Preferably, the ferromagnetic bars 234, 236 and magnet arrays 220, 222 of the LSM are sized wherein the levitation force generated by the LSM alone, is insufficient to levitate the vehicle 212. Also, the EDS is sized wherein the levitation force generated by the EDS alone, is insufficient to levitate the vehicle 212. Rather, only the combination of the levitating forces generated by the EDS and LSM are sufficient to levitate the vehicle 212. Since the EDS only generates a levitating force when the vehicle 212 is in motion, a support system 58, which may consist of wheels or rollers, is provided to support the vehicle until it has been accelerated by the LSM to lift-off speed. As shown, support system 58, which may consist of wheels or rollers, is provided to support the vehicle 212 until the minimum speed is obtained and levitation is achieved At this minimum speed, the EDS produces a levitation force that can combine with the levitation force of the LSM to levitate the vehicle 212 and allow the vehicle 212 to be propelled by the LSM.

Once the vehicle 212 is levitated by the EDS and LSM (i.e. at vehicle 212 speeds greater than the minimum speed described above), the EDS and LSM combine to maintain a substantially constant levitating force over a wide range of LSM gap widths 238. More specifically, consider a vehicle 212 at constant speed and relatively low levitation, the LSM gap width 238 is relatively large and the EDS gap width 248 is relatively small. Accordingly, the LSM levitating force is relatively weak and the EDS levitating force is relatively strong. On the other hand, at higher vehicle 212 levitations, the LSM gap width 238 is relatively small, the EDS gap width 248 is relatively large, and accordingly, the LSM levitating force is relatively strong and the EDS levitating force is relatively weak.

In the embodiment shown in FIG. 8, maximum LSM efficiency is obtained at high vehicle speeds (i.e. operating speeds). In greater detail, the EDS force is strongest at high vehicle 212 speeds. Since this force is repulsive between the EDS magnet array 228 and EDS conductive track 224, a relatively large EDS gap width 248 occurs at high vehicle speeds. Accordingly, a relatively small LSM gap width 238 occurs at high vehicle 212 speeds. As indicated above, the LSM is most efficient at small LSM gap widths 238. Thus, for the FIG. 8 embodiment, the LSM is most efficient at operating speed.

Mathematically, the stability of the system can be shown by calculating the LSM levitation force as a function of LSM gap and comparing it to the EDS levitation force. Starting with the LSM system, the magnetomotive levitation force, $\theta$ can be calculated as:

$$\theta = R\phi \quad \text{Eq. 1}$$

where R is reluctance, $$\frac{1}{\Omega \text{sec}},$$

and $\phi$ is the Flux, V·sec×$10^{-8}$ (Maxwell) the reluctance can be calculated as:

$$R = \sum \frac{l}{\mu_0 \mu A} \quad \text{Eq. 2}$$

where l is the length of magnetic circuit (general) cm,
$\mu_0$ is the permeability of vacuum, $(1.256 \times 10^{-6} \, \Omega \cdot \text{sec/cm})$,
$\mu$ is the permeability constant ($\cong 1$ for air), and
A is the cross-sectional area of circuit path segment, cm².
Summing over the magnetic circuit path, the magnetomotive force is:

$$\theta = \phi \left( \frac{l_0}{\mu_0 \mu A} + \frac{l_g}{\mu_0 A} \right) \quad \text{Eq. 3}$$

where $l_0$ is the length of permanent magnet bridge in cm and $l_g$ equals the total length of all air gaps. The flux can be calculated as:

$$\phi = BA \quad \text{Eq. 4}$$

where B is the magnetic field in gauss.

Combining Eq. 3 and Eq. 4:

$$\theta = BA \left( \frac{l_0}{\mu_0 \mu A} + \frac{l_g}{\mu_0 A} \right) \quad \text{Eq. 5}$$

which can be simplified to:

$$\theta = \frac{B}{\mu_0} \left( \frac{l_0}{\mu} + l_g \right) \quad \text{Eq. 6}$$

Eq. 6 can be solved to obtain the magnetic field:

$$B = \frac{\mu_0 \theta}{\left( \frac{l_0}{\mu} + l_g \right)} \quad \text{Eq. 7}$$

For an initial air gap $l_{g1}$, the magnetic field is:

$$B_1 = \frac{\mu_0 \theta}{\left( \frac{l_0}{\mu} + l_{g1} \right)} \quad \text{Eq. 8}$$

and for an air gap $l_{g2}$, the field is:

$$B_2 = \frac{\mu_0 \theta}{\left( \frac{l_0}{\mu} + l_{g2} \right)} \quad \text{Eq. 9}$$

Equations 9 and 10 can be combined to obtain an expression relating the field $B_2$ with the air gap $l_{g2}$, and the field $B_1$ with initial air gap $l_{g1}$:

$$B_2 = B_1 \frac{\frac{l_0}{\mu} + l_{g1}}{\frac{l_0}{\mu} + l_{g2}} \cong B_1 \frac{l_{g1}}{l_{g2}} \quad \text{Eq. 10}$$

The levitation force can be calculated as:

$$F = \frac{B^2 A}{2\mu_0} \quad \text{Eq. 11}$$

thus:

$$\frac{F_1}{F_2} = \frac{B_1^2}{B_2^2} \quad \text{Eq. 12}$$

and solving Eq. 12 for $F_2$:

$$F_2 = F_1 \frac{B_2^2}{B_1^2} \quad \text{Eq. 13}$$

combining Eq. 10 and Eq. 13:

$$F_2 = F_1 \frac{\left( B_1 \frac{l_{g1}}{l_{g2}} \right)^2}{B_1^2} \quad \text{Eq. 14}$$

which can be simplified to obtain the LSM force as a function of LSM gap:

$$F_2 = \left(\frac{l_{g1}}{l_{g2}}\right)^2 F_1 \qquad \text{Eq. 15}$$

A similar analysis can be conducted for the EDS system. The peak magnetic field at the surface of Halbach array, $B_0$, is:

$$B_0 = B_r(1 - e^{-kd})\frac{\sin\frac{\pi}{m}}{\frac{\pi}{m}} \qquad \text{Eq. 16}$$

where: $B_r$ is the residual permanent magnet flux density, m is the number of magnets in array $$k = \frac{2\pi}{\lambda}$$

with $\lambda$=wavelength of the Halbach array, and d is the permanent magnet thickness.

The lift pressure can be calculated as:

$$p_y = \frac{B_0^2}{\mu}\left(\frac{1}{1+\alpha^2}\right)e^{-2ky} \qquad \text{Eq. 17}$$

where $\mu$ is the permeability constant ($\cong 1$ for air) and $$\alpha = \frac{1}{\frac{\omega L}{R}}$$

where: L is the inductance of guideway Henry's, H,

R is the resistance of guideway, $\Omega$, and $$\omega = \frac{2\pi v}{\lambda}$$

with v being the vehicle velocity in m/sec.

The lift force can be calculated as:

$$K_y = p_y A$$

where A is the footprint. For an initial EDS gap $y_1$, $$p_{y_1} = \frac{B_0^2}{\mu}\left(\frac{1}{1+\alpha^2}\right)e^{-2ky_1} \qquad \text{Eq. 18}$$

Thus, $$K_{y_1} = \frac{AB_0^2}{\mu}\left(\frac{1}{1+\alpha^2}\right)e^{-2ky_1} \qquad \text{Eq. 19}$$

and for an EDS air gap $y_2$ $$K_{y_2} = \frac{AB_0^2}{\mu}\left(\frac{1}{1+\alpha^2}\right)e^{-2ky_2} \qquad \text{Eq. 20}$$

combining Eq. 19 and Eq. 20:

$$K_{y_2} = K_{y_1}\frac{e^{-2ky_2}}{e^{-2ky_1}} \qquad \text{Eq. 21}$$

which can be simplified to obtain the EDS force at any gap $y_2$ based on the EDS force at the initial EDS gap $y_1$.

$$K_{y_2} = K_{y_1}e^{2k(y_1-y_2)} \qquad \text{Eq. 22}$$

Typical values for the above equations are:

$B_0 = B_1 = 1T$ ($T$=Tesla=$10^4$ Gauss)

$l_0$=12 cm $\mu$=1600 v=22 m/sec $\lambda$=0.4 m, and k=15.7 m$^{-1}$

Figure 9:
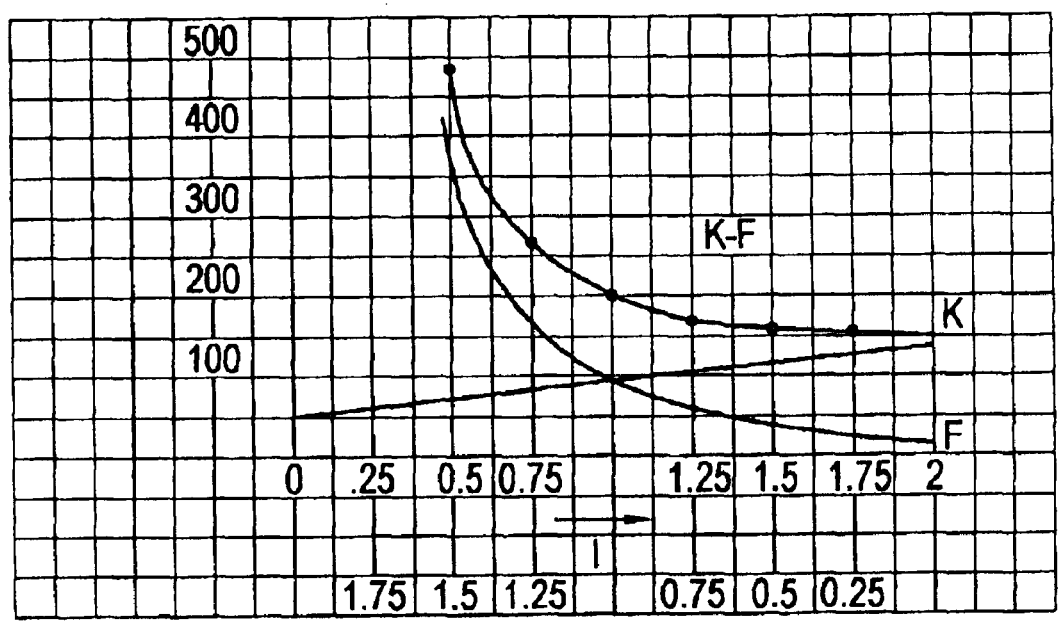
FIG. 9 shows the variation of the EDS and LSM forces as a function of EDS and LSM gap.

The variation in EDS and LSM force as a function of EDS and LSM gap can be tabulated (see below) and graphed (see FIG. 9) to show the stability of the system. The tabulation below assumes an initial LSM gap of 1 cm, initial LSM force of 100, initial EDS gap of 1 cm and initial EDS force of 100.

| $l_g$ | F |
|---|---|
| 0.25 | 1600 |
| 0.5 | 400 |
| 0.75 | 178 |
| 1.00 | 100 |
| 1.25 | 64 |
| 1.50 | 44.4 |
| 1.75 | 32.7 |
| 2.00 | 25 |

| y | K |
|---|---|
| 0.25 | 126.6 |
| 0.5 | 117 |
| 0.75 | 108 |
| 1.00 | 100 |
| 1.25 | 92 |
| 1.50 | 85 |
| 1.75 | 79 |
| 2.00 | 73 |

While the particular Magnetic Levitation and Propulsion System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for stabilizing movement of a vehicle in a direction along a guideway using a magnetic levitation and propulsion system which comprises:

a first means for generating a first electromagnetic force between the vehicle and the guideway, said first means including a plurality of magnets, with each magnet having two magnetic poles and defining a magnet axis connecting said poles, and with said magnets oriented to align said magnet axis substantially normal to said direction of vehicle propulsion, wherein said first force has a component for levitating the vehicle relative to the guideway and a component for propelling the vehicle along the guideway, with a first distance between the vehicle and the guideway being a function of said first force;

a second means for generating a second electromagnetic force between the vehicle and the guideway wherein said second force is reactive to said levitating component of said first force, with a second distance between the vehicle and the guideway being a function of said second force; and a means for controlling said first force to establish a predetermined ratio between said first distance and said second distance to stabilize movement of the vehicle.

2. A system as recited in claim 1 wherein said first means is a linear synchronous motor comprising:

a poly-phase winding on an armature mounted on the guideway;

a pair of parallel arrays mounted on said vehicle, wherein each said array includes a plurality of magnetic poles.

3. A system as recited in claim 1 wherein said first means is a linear synchronous motor comprising:

a switched d.c. winding on an armature mounted on the guideway; and a pair of parallel arrays mounted on said vehicle, wherein each said array includes a plurality of magnetic poles.

4. A system as recited in claim 1 wherein said second means is an electro-dynamic system comprising:

an array of magnets mounted on the vehicle; and
conductive material mounted on the guideway.

5. A system for levitating and propelling a vehicle in a direction along a guideway, said system comprising:

a linear synchronous motor having a first component mounted on said vehicle and a second component mounted on said guideway with said first and second components defining a gap width therebetween, one of said first and second components including a plurality of magnets, with each magnet having two magnetic poles and defining a magnet axis connecting said poles, and with said magnets oriented to align said magnet axis substantially normal to said direction of vehicle propulsion, said linear synchronous motor being operable to produce a first force between said components directed to levitate said vehicle, and a second force between said components directed to propel said vehicle along said guideway at a predetermined speed; and a means for maintaining said gap width between said components within a predetermined width range during vehicle travel along said guideway at said predetermined speed.

6. A system as recited in claim 5 wherein said maintaining means is an electrodynamic system (EDS) having a first EDS component mounted on said vehicle and a second EDS component mounted on said guideway.

7. A system as recited in claim 6 wherein one of said first and second EDS components comprises a magnet array and the other said EDS component comprises a plurality of conductive cables, with each said cable having a first end and a second end and extending in a direction orthogonal to the direction of vehicle travel with said ends of each said cable being electrically short-circuited.

8. A system as recited in claim 7 wherein said cable comprises a plurality of conductive strands disposed in a low magnetic permeability casing with each strand being fully transposed relative to the other said strands in said casing and wherein each said strand is sheathed in an insulative jacket.

9. A system as recited in claim 7 wherein said magnet array is arranged as a Halbach array.

10. A system as recited in claim 7 wherein said magnet array comprises a linear array of magnets having alternating polarities along said linear array.

11. A system as recited in claim 5 wherein one of said first and second components comprises a plurality of armatures with each said armature having at least one a.c. poly-phase distributed winding on an armature core, and the other said component comprises a plurality of magnetic poles.

12. A system as recited in claim 11 wherein said armature core comprises a first ferromagnetic bar and a second ferromagnetic bar, said first ferromagnetic bar being separated from said second ferromagnetic bar to establish an air gap therebetween.

13. A system as recited in claim 5 wherein one of said first and second components comprises a plurality of armatures with each said armature having direct-current switched windings on an armature core, and the other component comprises a plurality of magnetic poles.

14. A system as recited in claim 5 wherein said maintaining means is an electrodynamic system (EDS) and said EDS system is configured to produce a force that is substantially oriented in the same direction as said first force.

15. A system as recited in claim 14 wherein said first force generated by said linear synchronous motor is insufficient to levitate said vehicle.

16. A system as recited in claim 5 wherein said maintaining means is an electrodynamic system (EDS) and said EDS system is configured to produce a force that substantially opposes said first force.

17. A system as recited in claim 5 wherein said first force generated by said linear synchronous motor is greater than the force required to levitate said vehicle.

18. A system for levitating and propelling an object in a direction along a guideway, said system comprising:

a linear synchronous motor (LSM) having a first LSM component mounted on said object and a second LSM component mounted on said guideway with said first and second LSM components defining an LSM gap width therebetween, one of said first and second LSM components including a plurality of magnets, with each magnet having two magnetic poles and defining a magnet axis connecting said poles, and with said magnets oriented to align said magnet axis substantially normal to said direction of vehicle propulsion, said linear synchronous motor being operable to produce a first force between said LSM components directed to levitate said object, and a second force between said LSM components directed to propel said object along said guideway at a predetermined speed; and an electrodynamic system (EDS) having a first EDS component mounted on said object and a second EDS component mounted on said guideway, said electrodynamic system for producing a third force between said EDS components, said third force reactive with said first force to levitate said object and maintain said gap width between said LSM components within a predetermined width range during object travel along said guideway at said predetermined speed.

19. A system as recited in claim 18 wherein one of said first and second EDS components comprises a plurality of tracks with each said track comprising a plurality of conductive cables, and wherein the other said EDS component comprises a plurality of magnet arrays with each said magnet array positioned for electromagnetic interaction with one said track.

20. A system as recited in claim 19 wherein each said magnet array is arranged as a Halbach array.

21. A system as recited in claim 19 wherein said magnet array comprises a linear array of magnets having alternating polarities along said linear array.

22. A system as recited in claim 18 wherein one of said first and second LSM components comprises a plurality of armatures with each said armature having a winding on an armature core, each said armature core comprising a first ferromagnetic bar and a second ferromagnetic bar, said first ferromagnetic bar being separated from said second ferromagnetic bar to establish an air gap therebetween, and the other said LSM component comprises a first magnet array oriented for electromagnetic interaction with said first ferromagnetic bars of said armatures and a second magnet array oriented for electromagnetic interaction with said second ferromagnetic bars of said armatures.

23. A system as recited in claim 22 wherein said first and second magnet arrays are arranged as a Halbach array.

24. A system as recited in claim 22 wherein said first and second magnet arrays are linear magnet arrays having alternating magnetic polarities along each said linear magnet array.

* * * * *

UNITED STATES PATENT AND TRADEMARK OFFICE
CERTIFICATE OF CORRECTION

PATENT NO. : 6,827,022 B2
DATED : December 7, 2004
INVENTOR(S) : Hugo H. van den Bergh, Robert Kratz and Philip L. Jeter It is certified that error appears in the above-identified patent and that said Letters Patent is hereby corrected as shown below:

Column 9,
Line 54, delete "l" and insert -- $l$ --
Line 65, delete "l$_o$" and insert -- $l_o$ --
Line 66, delete "l$_g$" and insert -- $l_g$ --

Column 10,
Line 21, delete "l$_{g1}$" and insert -- $l_{g1}$ --

Signed and Sealed this

Nineteenth Day of April, 2005

JON W. DUDAS
*Director of the United States Patent and Trademark Office*